(12) United States Patent
Sano et al.

(10) Patent No.: US 10,864,765 B2
(45) Date of Patent: Dec. 15, 2020

(54) AUTOGRAPH SUPPORT DEVICE

(71) Applicant: FUJIFILM Corporation, Tokyo (JP)

(72) Inventors: Takahiro Sano, Kanagawa (JP);
Masayuki Naya, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/568,372

(22) Filed: Sep. 12, 2019

(65) Prior Publication Data

US 2020/0001646 A1 Jan. 2, 2020

Related U.S. Application Data

(63) Continuation of application No. PCT/JP2018/003875, filed on Feb. 5, 2018.

(30) Foreign Application Priority Data

Mar. 27, 2017 (JP) .................................. 2017-060930

(51) Int. Cl.
*G03B 21/13* (2006.01)
*B43L 13/18* (2006.01)
(Continued)

(52) U.S. Cl.
CPC ............ *B43L 13/18* (2013.01); *G03B 21/132* (2013.01); *H05B 47/11* (2020.01)

(58) Field of Classification Search
CPC ...... G03B 21/20; G03B 21/28; G03B 21/132; G03B 21/147; G03B 21/208;
(Continued)

(56) References Cited

U.S. PATENT DOCUMENTS 1,420,491 A 6/1922 Morse
5,751,477 A 5/1998 Tomita et al.
(Continued)

FOREIGN PATENT DOCUMENTS

JP 3009056 U 3/1995
WO 2016121362 A1 8/2016

OTHER PUBLICATIONS

International Search Report dated Apr. 24, 2018 from the International Searching Authority in counterpart International Application No. PCT/JP2018/003875.
(Continued)

*Primary Examiner* — Sultan Chowdhury
(74) *Attorney, Agent, or Firm* — Sughrue Mion, PLLC

(57) ABSTRACT

An autograph support device includes a supporting member that supports an image carrier having a planar image display surface such that the image display surface that displays a mirror image of an image displayed on a planar writing surface is located above the writing surface of a writing medium having the planar writing surface; and a half mirror that is disposed between the writing surface and the image display surface and has a mirror surface facing the image display surface . The image display surface and the writing surface are disposed at an equal optical distance from the mirror surface of the half mirror interposed therebetween. A writing surface lighting fixture that radiates light from the mirror surface side toward the writing surface side to illuminate the writing surface is provided on the writing surface side from the mirror surface.

11 Claims, 6 Drawing Sheets

(51) Int. Cl.
*H05B 47/11* (2020.01)
*G03B 21/132* (2006.01)

(58) Field of Classification Search
CPC .... G03B 21/625; H05B 47/11; H05B 47/155; H04N 9/31; H04N 9/74; H04N 9/093; H04N 9/3179; H04N 9/3185; H04N 9/3194; G06F 3/0346; G06F 3/0354; G06F 3/03542; G06F 3/0353; G06F 3/0355; B43L 13/026; B43L 13/10; B43L 13/12; B43L 13/14; B43L 13/18; B43L 13/147

See application file for complete search history.

(56) References Cited

U.S. PATENT DOCUMENTS

| | | | | |
|---|---|---|---|---|
| 2014/0192089 A1* | 7/2014 | Honda | ............. | G06F 3/005 345/661 |
| 2014/0340367 A1* | 11/2014 | Inoue | ............. | G06F 3/0304 345/177 |
| 2017/0320353 A1 | 11/2017 | Naya | | |

OTHER PUBLICATIONS

International Preliminary Report on Patentability dated Oct. 1, 2019 from the International Bureau in counterpart International Application No. PCT/JP2018/003875.

Written Opinion dated Apr. 24, 2018 from the International Bureau in counterpart International Application No. PCT/JP2018/003875.

\* cited by examiner

AUTOGRAPH SUPPORT DEVICE

CROSS-REFERENCE TO RELATED APPLICATIONS

This application is a continuation application of International Application No. PCT/JP2018/003875, filed Feb. 5, 2018, the disclosure of which is incorporated herein by reference in its entirety. Further, this application claims priority from Japanese Patent Application No. 2017-060930, filed Mar. 27, 2017, the disclosure of which is incorporated herein by reference in its entirety.

BACKGROUND OF THE INVENTION

1. Field of the Invention

The present invention relates to an autograph support device that performs guiding for preventing collapse of lines or balance in a case where characters are written by hand.

2. Description of the Related Art

In order to prevent collapse of lines or balance in a case where characters are written in a document that needs to be handwritten, a handwriting support system using a projector is suggested in "Support System for Pen or Pencil Using Projector"; Heisei No. 21; Research Presentation, Student Association of Tokyo Brach, The Institute of Electronics, Information and Communication Engineers; Lecture No: 161 (in the following, referred to as Reference Document 1) by Sota Nakajima, et al.

A support system for writing well-balanced beautiful characters by projecting model characters onto paper using a projector to trace the projected characters is suggested in the above Reference Document 1. Specifically, a target onto which characters are written is imaged by a camera, the image is used to create an image as the target is seen from above, characters are written onto the generated image, using a graphic user interface (GUI), the characters are projected onto the target from the projector, and the projected characters are made to trace.

However, in a case where the characters are projected by the projector, there is a problem that the projected characters are not easily seen due to the shadow of a hand of a writer who actually writes the characters, and a support function decreases.

An autograph support device that has solved the above problem is suggested by the present applicant in WO2016/121362A. The device of WO2016/121362A is configured such that a mirror image of an image serving as a model to be displayed on an upper image display surface is reflected by a half mirror, and a user who is a writer is made to visually recognize a reflection image (virtual image) so as to coincide with a writing surface, and a problem that projected characters are not easily seen due to a shadow of a user's hand does not occur.

SUMMARY OF THE INVENTION

However, regarding the autograph support device of Patent Document 1, it has been found that problems occur in the visibility of an image resulting from the user such that that reflection image is not easily recognized visually or, conversely, the writing surface is not easily recognized visually and there is a case where an excellent autograph support function cannot be exhibited.

The invention has been made in view of the above circumstances, and an object thereof is to provide an autograph support device that can prevent degradation of an autograph support function accompanying a user's shadow and poor visibility.

An autograph support device of the invention comprises a supporting member that supports an image carrier having a planar image display surface that displays a mirror image of an image displayed on a planar writing surface such that the image display surface is located above the writing surface of a writing medium having the planar writing surface; and a half mirror that is disposed between the writing surface and the image display surface and has a mirror surface facing the image display surface. The image display surface and the writing surface are disposed at an equal optical distance from the mirror surface of the half mirror interposed therebetween. A writing surface lighting fixture that radiates light from the mirror surface side toward the writing surface side to illuminate the writing surface is provided on the writing surface side from the mirror surface.

Here, the image display surface and the writing surface being disposed at the equal optical distance from the mirror surface interposed therebetween means that an optical distance from an optional point of the mirror surface to an intersection point between a perpendicular line intersecting the mirror surface at right angles through this optional point and the image display surface, and an optical distance from the optional point to an intersection point between the same perpendicular line and the writing surface are equal to each other.

As long as the image display surface and the writing surface are disposed at the equal optical distance from the mirror surface interposed therebetween, the writing surface, the mirror surface, and the image display surface may be disposed parallel to each other, or the writing surface and the image display surface may be symmetrically disposed at an inclination with respect to the mirror surface.

The mirror image of the image displayed on the writing surface is an image obtained by drawing the mirror image observed on the mirror surface in a case where the image displayed on the writing surface is projected on a mirror.

Although the writing medium may be placed on any desk or the like, the autograph support device of the invention may comprise a supporting base that supports the writing medium.

In the autograph support device of the invention, it is preferable that a illuminance of the writing surface lighting fixture that illuminates the writing surface is variable.

Additionally, it is preferable that the writing surface lighting fixture is disposed at two spots that face each other across the center of the writing surface.

It is preferable that the writing surface lighting fixture is disposed at a peripheral edge of the half mirror.

It is preferable that the autograph support device of the invention further comprises a sensor that measures a luminance of the writing surface; and a control unit that controls, on the basis of the luminance measured by the sensor, at least one of a luminance of a reflection image of the image display surface visually recognized by being reflected from the half mirror and a luminance of a transmission image of the writing surface visually recognized by transmitting the half mirror, and adjusts a ratio of the luminance of the reflection image and the luminance of the transmission image.

In the autograph support device of the invention, it is preferable that the image carrier is constituted by a flat panel display, and the control unit controls the luminance of the reflection image by changing a luminance of a backlight of the flat panel display.

The control unit may control the luminance of the reflection image by changing a K value of CMYK signal values of the mirror image displayed on the image carrier.

It is preferable that the autograph support device of the invention further comprises a hand-side lighting fixture that illuminates a hand side including at least one of a writing tool in use or fingers of a user having the writing tool.

It is preferable that the hand-side lighting fixture is disposed between the mirror surface and the writing surface, and applies with illumination light of which spread to the mirror surface and the writing surface is limited to a portion between the mirror surface and the writing surface.

In the autograph support device of the invention, it is preferable the hand-side lighting fixture applies illumination light from two different directions.

It is preferable that a wavelength of the illumination light of the hand-side lighting fixture is monochromatic.

The autograph support device of the invention comprises the supporting member that supports the image carrier having the planar image display surface such that the image display surface that displays the mirror image of the image displayed on the planar writing surface is located above the writing surface of the writing medium having the planar writing surface, and the half mirror that is disposed between the writing surface and the image display surface and has the mirror surface facing the image display surface, and the image display surface and the writing surface is configured to be capable of being disposed at an equal optical distance from the mirror surface of the half mirror interposed therebetween. By virtue of such a configuration, a user of the half mirror who sees the writing surface from above can visually recognize the reflection image of the mirror image on the writing surface, and can perform display without shadowing the image by a hand with the writing tool even in a case where the user traces the image.

The autograph support device of the invention comprises the writing surface lighting fixture that radiates light from the mirror surface side toward the writing surface side to illuminates the writing surface, on the writing surface side from the mirror surface. Thus, the luminance of the transmission image from the writing surface with respect to the reflection image reflected by the half mirror can be adjusted. Since the luminance adjustment is possible, it is possible to make the user excellently recognize each of the transmission image and the reflection image.

That is, according to the autograph support device of the invention, degradation of a support function resulting from a user's shadow can be prevented, and degradation of the support function accompanying degradation of the visibility of the image can be prevented, and excellent autograph support is possible.

DESCRIPTION OF THE PREFERRED EMBODIMENTS

Hereinafter, embodiments of the invention will be described with reference to the drawings.

Figure 1:
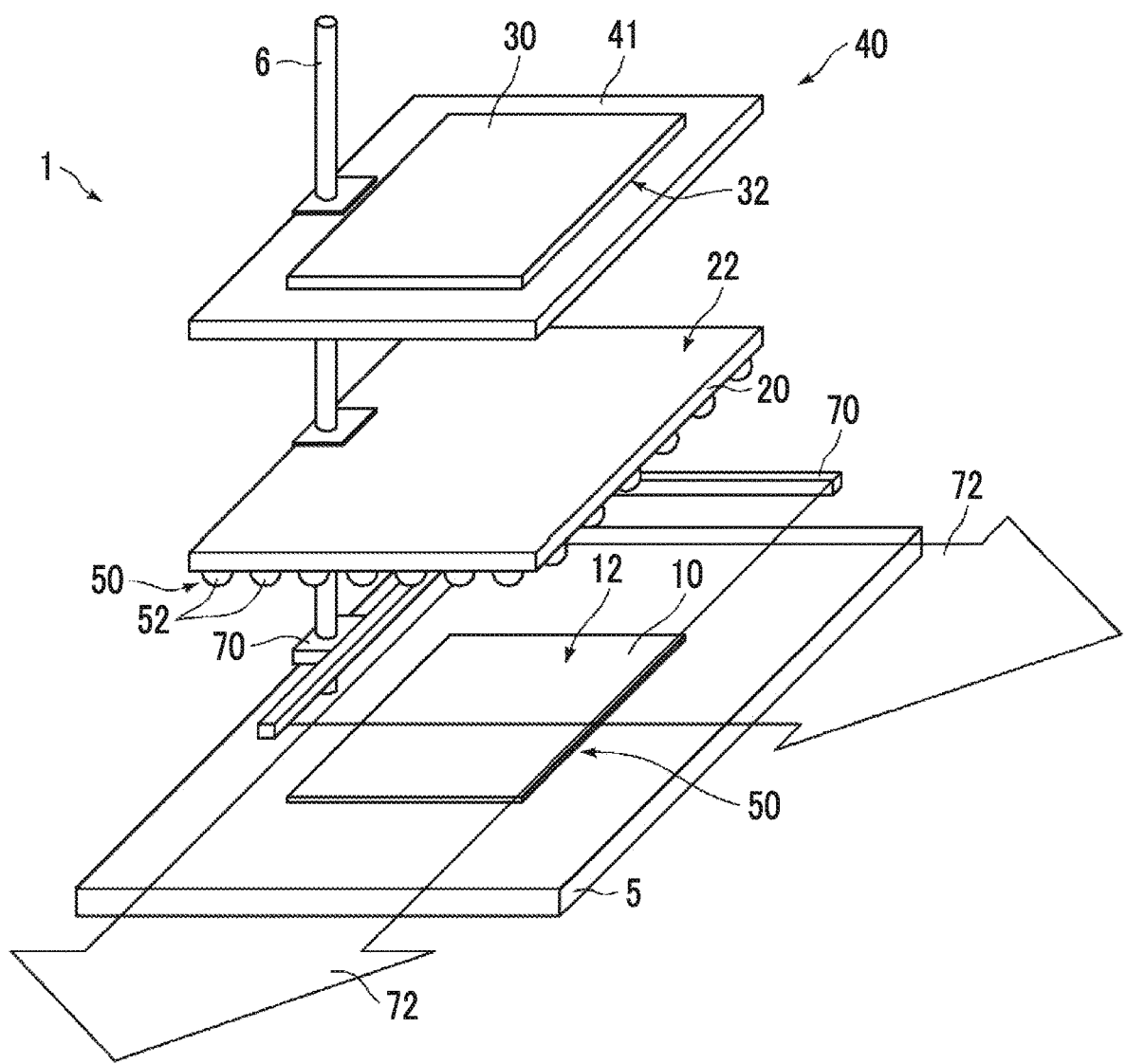
FIG. 1 is a perspective view illustrating a schematic configuration of an autograph support device of a first embodiment of the invention.
Figure 2:
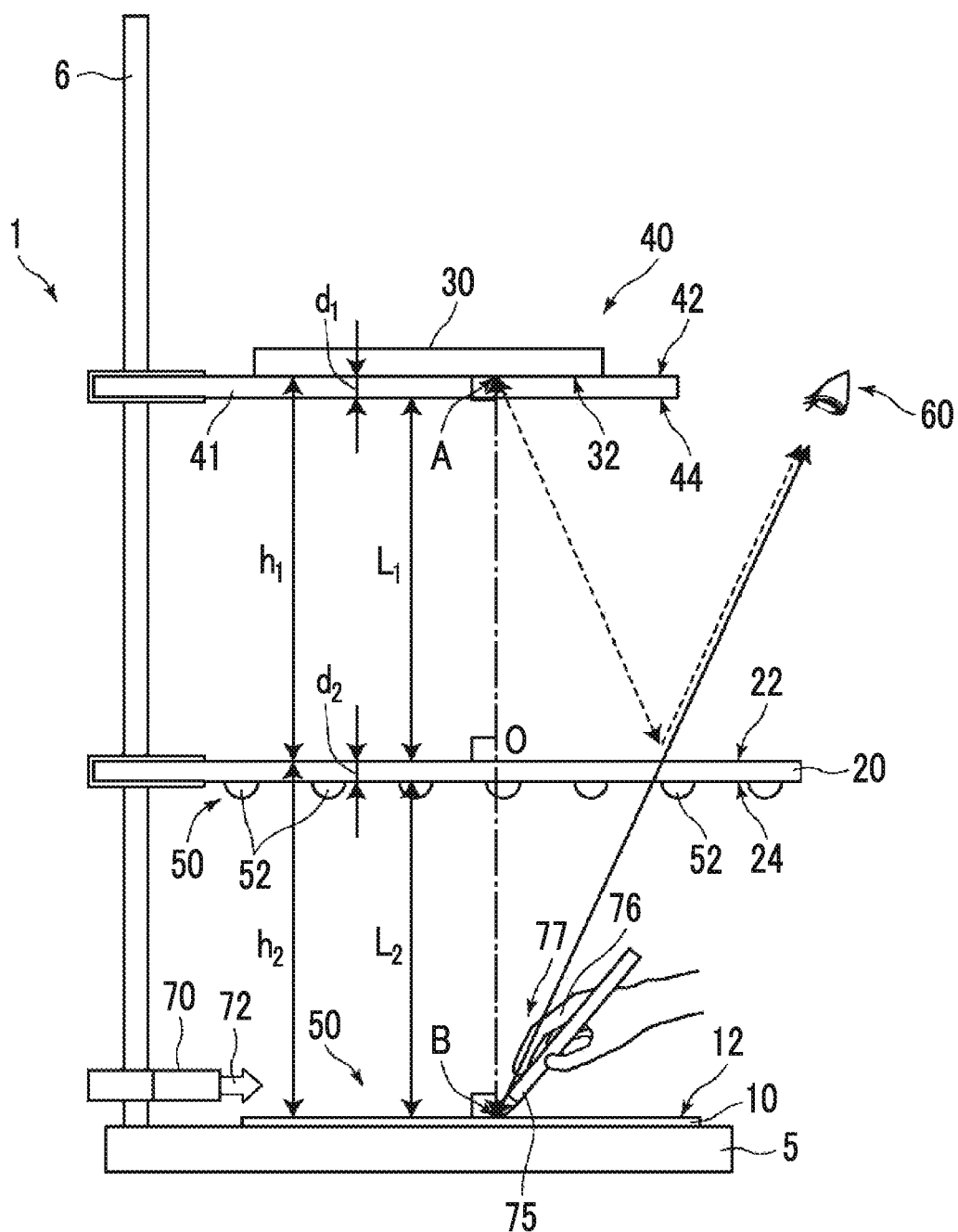
FIG. 2 is a side view illustrating a schematic configuration of the autograph support device illustrated in FIG. 1.

FIG. 1 is a perspective view illustrating a schematic configuration of an autograph support device of an embodiment of the invention, and FIG. 2 is a side view illustrating a positional relationship between a writing surface, a mirror surface, and an image display surface in the autograph support device 1 of the present embodiment.

As illustrated in FIGS. 1 and 2, the autograph support device 1 of the present embodiment comprises a supporting member 40 that supports an image carrier 30 having a planar image display surface 32 such that the image display surface 32 that displays a mirror image of an image displayed on a planar writing surface 12 is located above the writing surface 12 of a writing medium 10 having the planar writing surface 12, and a half mirror 20 that is arranged between the writing surface 12 and the image display surface 32 and has the mirror surface 22 facing the image display surface 32, and the image display surface 32 and the writing surface 12 are disposed at an equal optical distance from the mirror surface 22 of the half mirror 20 interposed therebetween. The half mirror 20 having the mirror surface 22 that faces the image display surface 32 means that the mirror surface (reflecting surface) of the half mirror 20 is disposed to face the image display surface.

Also, the present autograph support device 1 comprises the writing surface lighting fixture 50 that radiates light from the mirror surface 22 side toward the writing surface 12 side to illuminates the writing surface 12, on the writing surface 12 side from the mirror surface 22.

In the present embodiment, the autograph support device 1 comprises a supporting base 5 on which the writing medium 10 is placed, and a supporting shaft (supporting rod) 6 for locating the half mirror 20 and the supporting member 40 of the image carrier 30 on the supporting base 5. It is preferable that the half mirror 20 and the supporting member 40 are configured so as to be movable up and down along the supporting shaft 6.

The supporting member 40 of the image carrier 30 comprises a supporting plate 41 for placing the image carrier 30. The supporting plate 41 has the transparency such that the image displayed on the image display surface 32 of the image carrier 30 can be copied on the mirror surface 22, and it is preferable that the supporting plate is a transparent substrate of glass, acrylics, or the like which is transparent to visible light. The reflectivity of the front surface of the glass or acrylic plate is about 4%. Since the brightness of the image display surface is reduced by the plate being interposed, it is preferable that both surfaces 42 and 44 (refer to FIG. 2) of the supporting plate 41 are subjected to antireflection treatment. It is preferable that the reflectivity of both the surfaces 42, 44 of the supporting plate 41 with respect to the visible light (380 nm to 780 nm) is, for example, less than 1%.

In the present embodiment, the mirror surface 22 of the half mirror 20 is a surface on the image carrier 30 side, and is located such that the writing surface 12, the mirror surface 22, and the image display surface 32 are parallel to each other, and an optical distance $h_1$ between the image display surface 32 and the mirror surface 22 and an optical distance $h_2$ between the mirror surface 22 and the writing surface 12 become equal toe each other. That is, the optical distance $h_1$ from an arbitrary point O of the mirror surface 22 to an intersection point A between a perpendicular line intersecting the mirror surface 22 at right angles through this arbitrary point O and the image display surface 32, and the optical distance $h_2$ from the arbitrary point O to an intersection point B between the same perpendicular line and the writing surface 12 are equal to each other.

In the present example, the optical distance $h_1$ between the image display surface 32 and the mirror surface 22 is expressed by a sum of a product $n_1 \cdot d_1$ of a thickness $d_1$ and a refractive index n1 of the supporting plate 41, and a distance $L_1$ between a lower surface 44 of the supporting plate 41, and the mirror surface 22, that is, $h_1=n_1 \cdot d_1+L_1$. Additionally, the optical distance $h_2$ between the mirror surface 22 and the writing surface $l_2$ is expressed by a sum of a product $n_2 \cdot d_2$ of a thickness $d_2$ of the half mirror 20, and a refractive index $n_2$, and a distance $L_2$ between the lower surface 24 of the half mirror 20, and the writing surface 12, that is, $h_2=n_2 \cdot d_2+L_2$.

By adjusting the position of the half mirror 20 and the position of the image carrier 30 such that the above optical distances $h_1$ and $h_2$ become equal to each other, as illustrated in FIG. 2, a reflection image obtained by the mirror image displayed on the image display surface 32 of the image carrier 30 being reflected by the mirror surface 22 and visually recognized is seen to coincide with the writing surface 12 in a case where a user has seen the writing surface 12 from above the half mirror 20. That is, an image surface of a virtual image of the mirror image displayed on the image display surface 32 coincides with the writing surface 12. In this case, the image seems to be directly projected onto the writing surface 12. Actually, the user sees the reflection image (virtual image) of the mirror image reflected by the mirror surface 22, and the image is not directly projected onto the writing surface 12 from the image carrier 30. In addition, in the following, the position of a user's eye in a case where the users sees the writing surface 12 from above the half mirror 20 is referred to an observation part 60.

Figure 3A:
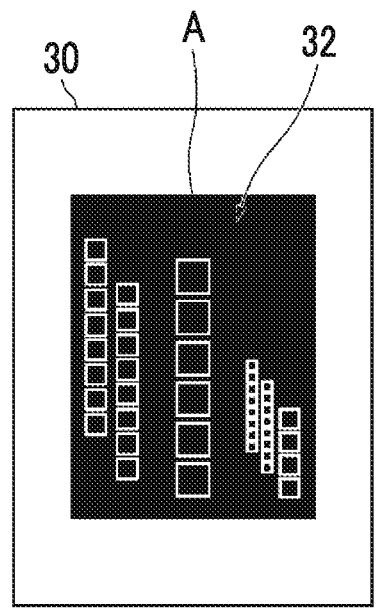
FIG. 3A and 3B are a schematic view illustrating an image displayed on an image display surface and a writing surface.
Figure 3B:
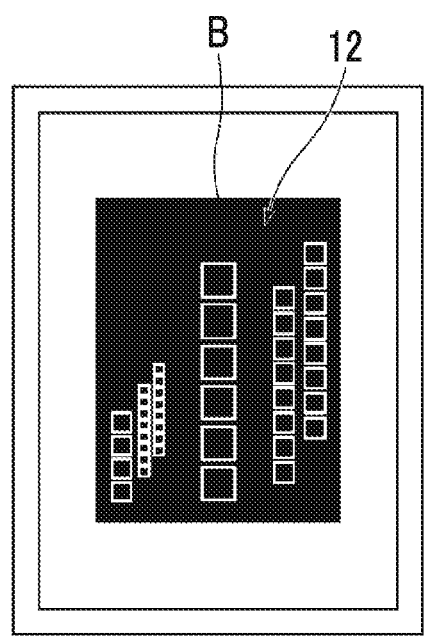

In FIG. 3A and FIG. 3B, a left figure is a mirror image A displayed on the image display surface 32 of the image carrier 30, and a right figure is a reflection image of the mirror image A that is visually recognized to overlap the writing surface, that is, is an image B to be displayed. The image B illustrated herein represents squares of a region where the address, destination, and the like of a postcard should be written. By writing characters within the displayed squares, well-ordered character strings can be obtained.

A half mirror 20 is composed of a surface serving as the mirror surface 22, and a surface 24 not comprising a mirror surface. The half mirror 20 may be a half mirror that reflects a portion of the light incident onto the mirror surface and transmits a portion of the light, and as illustrated in FIG. 2, may be a half mirror that allows the writing surface 12 to be visually recognized from the observation part and that has the reflectivity and the transmittance such that the mirror image (the image to be displayed originally) B of the mirror image A that is reflected by the half mirror 20 and displayed on the image display surface 32 can be overlappingly and visually recognized on the writing surface 12. Although the reflectivity of the half mirror may be appropriately determined in a range of 1% or more and 99% or less depending on the configuration of an optical system in the autograph support device, it is more preferable that the reflectivity is in a range of 4% or more and 85% or less.

It is preferable that the mirror surface of the half mirror shows the above reflectivity with respect to the entire visible range. However, for example, in a case where a display color of the image display surface is determined in advance with respect to a specific partial wavelength range of the visible range, the mirror surface may show the above reflectivity with respect to the light of a wavelength range of the display color. For example, in a case where an image is displayed with blue light on an image display surface, the mirror surface may reflect only blue wavelength.

It is preferable that the surface 24 of the half mirror 20 is an antireflection surface. The reflectivity of the antireflection surface may be reflectivity such that an image resulting from reflection on the surface 24 visually recognized from the observation part does not cause double reflection in an image resulting from reflection on the mirror surface 22, and is, for example, less than 0.1 time of the reflectivity of the mirror surface 22.

The reflectivity of the antireflection surface with respect to the light of the visible range is preferably less than 1%, and is more preferably 0.5% or less. Such an antireflection surface with a reflectivity of less than 1% can be obtained by well-known antireflection treatment, such as formation of a dielectric multilayer film, or formation of a fine irregular structure layer.

In addition, the reflectivity of the mirror surface 22 and the reflectivity of the surface 24 may not necessarily be uniform over the entire surface.

The positions of the image display surface 32, the mirror surface 22, and the writing surface 12 may be adjusted while performing observation from the observation part 60 such that the reflection image of the mirror image coincides with the writing surface 12 (the image surface of the virtual image coincides with the writing surface). In a case where user visually recognizes that the reflection image coincide with the writing surface 12, the optical distance $h_1$ between the image display surface 32 and the mirror surface 22 and the optical distance $h_2$ between the writing surface 12 and the mirror surface 22 coincide with each other.

Moreover, in order to make the optical distance $h_1$ between the image display surface 32 and the mirror surface 22 and the optical distance $h_2$ between the writing surface 12 and the mirror surface 22 coincide with each other, the autograph support device 1 may be provided with positional adjustment marks. For example, the positional adjustment marks are provided at mutually corresponding positions on a surface including the image display surface 32 and a surface including the writing surface 12, and the positions of the image display surface 32 and the half mirror 20 are adjusted such that the positional adjustment marks on the image display surface visually recognized from the observation part and the positional adjustment marks on the writing surfaces overlap each other, respectively. Accordingly, adjustment to the positions where the relationship $h_1=h_2$ between the image display surface 32, and the writing surface 12, and the mirror surface 22 of the half mirror 20 is satisfied can be easily made.

The image carrier 30 is not particularly limited as long as the mirror image is displayed on one surface, and for example, a sheet on which the mirror image is drawn on one surface. In addition, the image carrier 30 may be a flat panel display that displays a mirror image. The flat panel display may be connected to a separate computer with or without wires, or may be a tablet computer or a smart phone.

The image displayed on the writing surface 12, in the present embodiment includes layout or squares of an address surface (front surface) or a text surface (back surface) of a letter or a postcard, a navigator of a good hand, and a drawing frame, a paperwork guide, or the like, and the image carrier 30 displays the mirror image that is an image obtained by drawing the mirror image observed on a mirror surface in a case where these images to be displayed are projected onto a mirror.

The autograph support device of the invention can display layouts or squares on the writing surface, thereby entering well-ordered character strings on a paper surface without lines or squares, can display model characters, thereby using the characters in order to trace the characters and write balanced characters, and can also display a drawing frame, thereby writing illustration or performing painting.

Additionally, the autograph support device of the invention not only can trace displayed characters or picture, but also can display an arrow indicating a spot to be written, as a paperwork guide on a documents surface, in a public office, a bank, or the like, and thereby can be used in order to support the paperwork.

In addition, the autograph support device of the invention is applicable to surgery support, surgery education, assembly work support, experimental work support, and the like in addition to the paperwork support.

The writing surface lighting fixture 50 is not particularly limited as long as light is radiated from the mirror surface 22 side toward the writing surface 12 side. Here, the "light is irradiated from the mirror surface 22 side" toward the writing surface 12 side means that the emission direction of the light emitted from a light source provided in the writing surface lighting fixture 50 faces the writing surface side from the mirror surface side, and the light is radiated such that the light does not enter the mirror surface 22.

In the present embodiment, the writing surface lighting fixture 50 comprises a plurality of light sources 52 at a circumferential edge of the lower surface 24 of the half mirror 20, and is disposed such that the light emission direction of the light source 52 faces the writing surface 12 side. The light source 52 can be constituted of, for example, an LED light.

The illuminance in a case where the writing surface lighting fixture 50 illuminates the writing surface 12 is variable. In a case where the illuminance by the writing surface lighting fixture 50 varies, the luminance of the writing surface 12 varies accordingly. In the present embodiment, the light emission amount of each light source 52 is variable, and the writing surface lighting fixture 50 comprises a light modulation unit (not illustrated) that is connected to a singular or a plurality of light sources 52 and adjusts such light emission amounts thereof. By changing the light emission amount of each light source 52, the illuminance can be changed. In addition, the illuminance may be changed such that the number of light sources to be simultaneously turned on among the plurality of light sources 52 is changed.

In the present embodiment, although the plurality of light sources 52 are disposed at substantially equal intervals on four sides that constitute the peripheral edge of the rectangular surface 24, the light source 52 to be provided may be singular. However, it is preferable that the light sources 52 are disposed at two or more spots that face each other across the center of the writing surface 12 so as to illuminate the writing surface 12 from two directions that face each other across at least the center of the writing surface 12.

Additionally, the writing surface lighting fixture 50 is not limited to a configuration in which the fixture is installed in the half mirror 20, and for example, may be attached to the supporting shaft 6.

In the autograph support device 1, by comprising the writing surface lighting fixture 50, it is possible to adjust a ratio between the luminance of a transmission image of the writing surface 12 observed from the observation part 60 and the luminance of the reflection image resulting from the mirror surface 22 of the image displayed by the image carrier 30. Particularly, as long as the illuminance of the writing surface 12 by the writing surface lighting fixture 50 is variable, it is possible to adjust the ratio between the luminances more accurately. As long as the luminance of the transmission image, the luminance of the reflection image, and the luminance ratio between both the luminances are in an appropriate range that is the range of human visual ability, degradation of a support function accompanying degradation of the visibility of the transmission image and/or the reflection image can be prevented.

The user can turn and adjust, dials of, for example, a dial type light modulation unit of the writing surface lighting fixture 50 such that the model image and the transmission image of the writing surface can be excellently and visually recognized while observing the writing surface 12 and the model image (reflection image) visually recognized to coincide with the writing surface 12.

Figure 4:
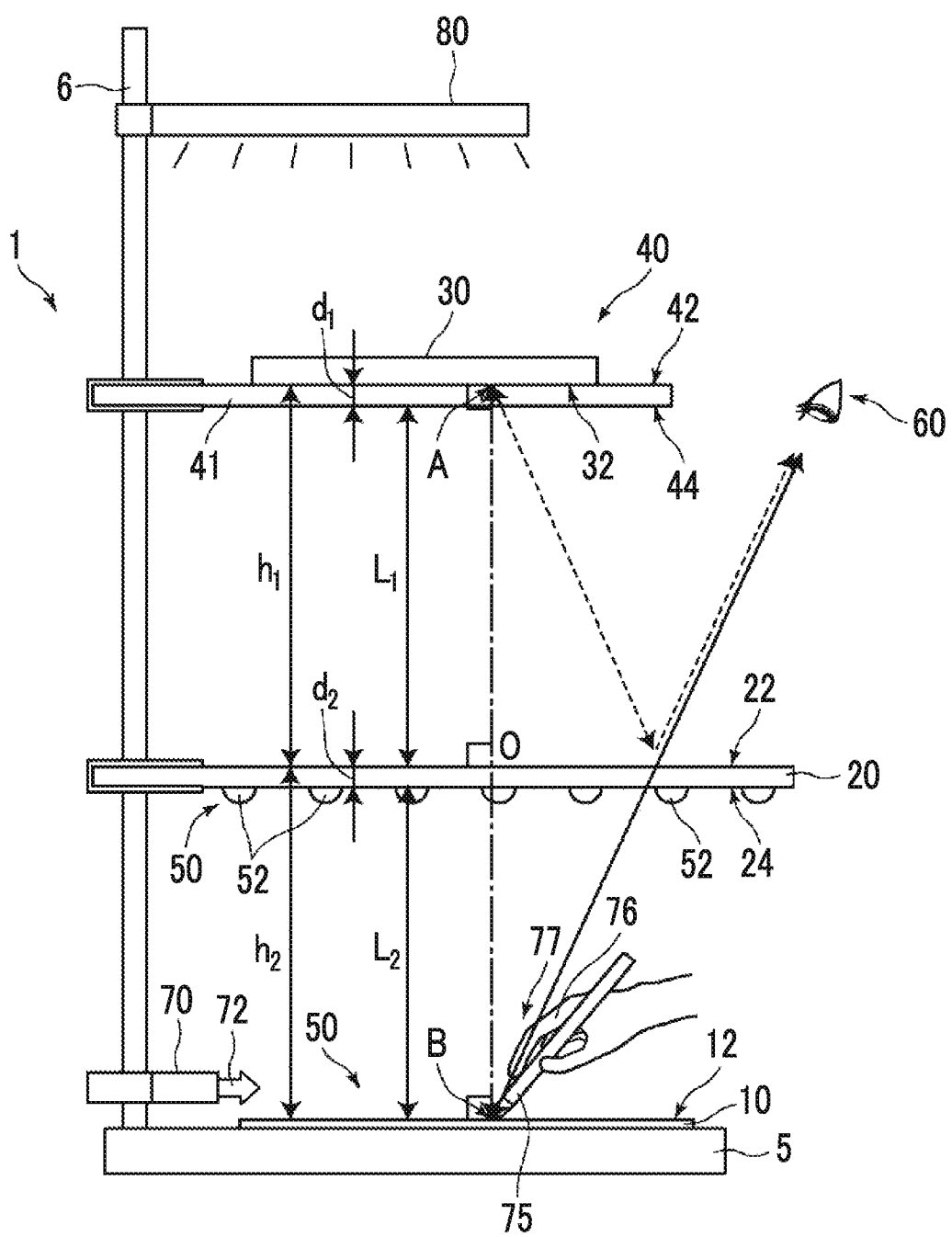
FIG. 4 is a side view illustrating the configuration of a design change example of the autograph support device of the first embodiment.

In addition, as illustrated in FIG. 4, a display surface lighting fixture 80 that irradiates the image display surface 32 with illumination light may be further provided. In cases where the image carrier 30 is carriers, such as paper, which does not carry out luminescent display and has an image drawn on a surface thereof, the image can be brightly projected on the mirror surface 22 by irradiating the image display surface 32 with illumination light by the display surface lighting fixture 80. In FIG. 4, although the invention is configured so as to irradiate the image carrier 30 with illumination light from a back side (an upper part of the display surface in the drawing) of the image display surface 32, the invention may be configured so as to irradiate the image carrier 30 with illumination light from a front side (a lower part of the display surface in the drawing) of the image display surface 32.

By comprising such a display surface lighting fixture 80, the luminance of the reflection image of the image carried on the image carrier 30 which does not perform the luminescent display can be improved. As long as the display surface lighting fixture 80 comprises the light modulation unit that can adjust the light emission amount of light sources, luminance adjustment can be more accurately performed. Even in this case, the user can turn and adjust dial type light modulation units of one or both of the writing surface lighting fixture 50 and the display surface lighting fixture 80 so that the transmission image of the writing surface, and the model image can be visually recognized excellently while observing the writing surface 12 and the model image (reflection image).

Moreover, the autograph support device 1 of the present embodiment comprises a writing tool 75 held by the user in use, and a hand-side lighting fixture 70 that illuminates a hand side 77 including at least one of user's fingers (fingers of a hand) 76. In addition, the hand side 77 means the user's fingers 76 that hold the writing tool 75, the portion of the writing tool 75 held by the fingers 76, and a distal side from the portion.

As already described, a shadow resulting from the user's fingers is not generated in the reflection image displayed on the writing surface 12. On the other hand, there is a case where the reflection image partially overlaps the user's hand side and a portion of the reflection image is displayed on the user's hand side. By illuminating the hand side by the hand-side lighting fixture 70 with sufficiently high luminance as compared to the luminance of the reflection image displayed on the hand side, the reflection image displayed on the hand side can be made invisible to the user. This is because, as the hand side is illuminated and brightened, the luminance of the reflection image is relatively lowered and is not recognized by human eyes.

In this way, by comprising the hand-side lighting fixture 70 to illuminate the hand side, and by bringing about a state where the reflection image displayed on the hand side does not appear, and the fingers of the user who hold the writing tool and the writing tool are visually recognized, the autograph support device 1 can be used without discomfort.

It is preferable that the hand-side lighting fixture 70 is a lighting fixture configured so as to illuminate the hand side 77 without illuminating the mirror surface 22 and the writing surface 12. Here, the "without illuminating the mirror surface 22 and the writing surface 12" means that principal rays of the illumination light do not enter the mirror surface and the writing surface 12, and does not exclude even a case where a portion of the illumination light enters the mirror surface 22 or the writing surface 12 in a range that does not have an influence on an above effect.

The hand-side lighting fixture 70 in the present embodiment is disposed between the mirror surface 22 and the writing surface 12 in a height direction of the autograph support device 1, and irradiates a portion between the mirror surface 22 and the writing surface 12 with the light of which the spread to the mirror surface 22 and the writing surface 12 is limited to the supporting base 5. Here, light 72 that proceeds substantially parallel to the mirror surface 22 and the writing surface 12 is radiated. The hand-side lighting fixture 70 only need to illuminate the user's hand side, and is preferably provided so as to illuminate the hand side from the front of the user or illuminate the hand side from a side. As illustrated in FIG. 1, hand-side lighting fixtures 70 may be respectively installed in two different directions (the front and the side). In addition, in a case where the user's hand side is illuminated from the side, it is preferable that the illumination is made from the side opposite to a user's dominant hand. It is preferable that the hand side is illuminated from a user's left-hand side in the case of a right-handed person and is illuminated from a user's right-hand side in the case of a left-handed person.

It is preferable that the emitted light 72 from the hand-side lighting fixture 70 is sheet-like light parallel to the supporting base 5, and such sheet-like light can be realized combining an LED light source with an illumination optical system comprising a cylindrical lens. The light emitted from the LED light source can be radiated as light that spreads in a sheet shape substantially parallel to the supporting base 5 due to the function of the cylindrical lens.

Although a white light source may be used for the light sources provided in the hand-side lighting fixture 70, it is preferable to use a monochromatic light source. As the monochromatic light source, a red or a green light source is preferable, and for example, a red LED having a peak wavelength at more than 650 nm to 700 nm, or a green LED having a peak wavelength at 500 nm to 650 nm can be used. This is because the hand side illuminated in red or green does not cause the user to feel uncomfortable feeling and the user is allowed to see the hand side clearly.

In addition, it is preferable that the hand-side lighting fixture 70 also comprises the light modulation unit that can adjust the light emission amounts of the light sources. As long as the hand-side lighting fixture 70 can modulate light, the user can adjust the hand-side illuminance depending on preference.

The hand-side lighting fixture 70 is not limited to the aspect of the above-mentioned embodiment, and a writing tool 75 in which a distal end part twinkles may be used. In this case, the illumination provided in the writing tool 75 is equivalent to the hand-side lighting fixture.

The autograph support device 1 of the present embodiment is configured as above. By comprising the writing surface lighting fixture 50, the present autograph support device 1 can adjust the luminance of the transmission image from the writing surface 12 with respect to the reflection image reflected by the half mirror 20, and can make the user to recognize each of the transmission image and the reflection image excellently. That is, high usability can be realized without lowering the support function in the autograph support device 1.

The autograph support device 1 may comprise a moving mechanism which moves the half mirror 20 and the image display surface 32 with respect to the writing surface 12 while maintaining the optical distance $h_1$ between the image display surface 32 and the mirror surface 22 and the optical distance $h_2$ between the writing surface 12 and the mirror surface 22 in the same relationship. The moving mechanism can be realized with, for example, a configuration comprising a gear or the like for moving such that the movement of the image display surface 32 is twice as large as the movement of the mirror surface 22.

Figure 5:
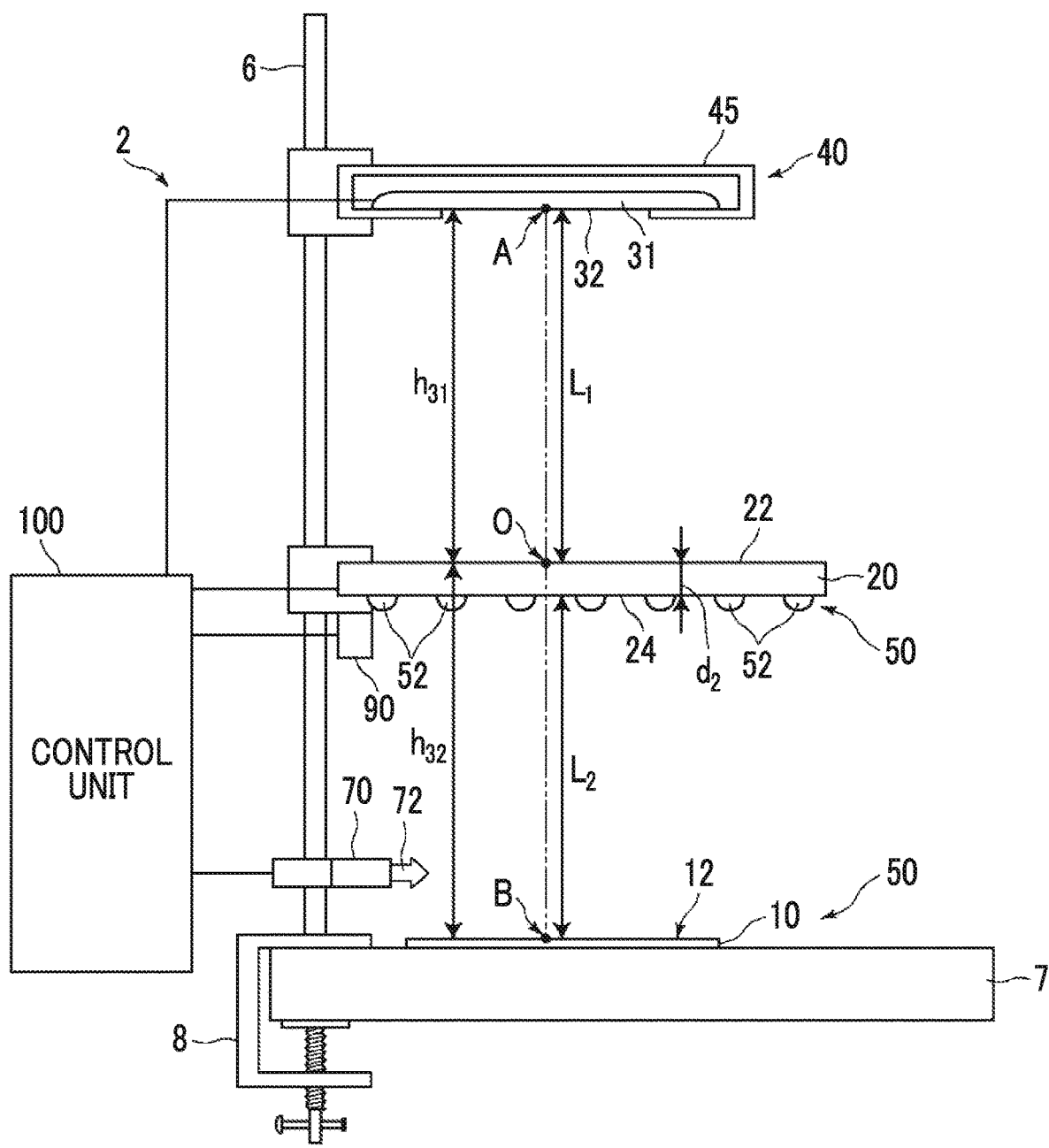
FIG. 5 is a side view illustrating a schematic configuration of an autograph support device of a second embodiment of the invention.

FIG. 5 is a side view illustrating a schematic configuration of an autograph support device 2 of a second embodiment of the invention.

In the autograph support device 1 of the first embodiment, a configuration including the supporting base 5 that supports the writing medium 10 has been described. However, the autograph support device 2 of the present embodiment does not comprise the supporting base 5. Instead of comprising the supporting base 5, a vise fixing part 8 for installation in the existing desk is provided at a bottom part of the supporting shaft 6, and can be used after the autograph support device 2 is installed by clamping and fixing a top plate 7 of the existing desk with a vice.

Additionally, in the autograph support device 1 of the first embodiment, a configuration in which the supporting member 40 comprises the supporting plate 41 on which the image carrier 30 is placed has been described. As long as a shape such that the image carrier 30 can be supported is provided, the configuration of the supporting member 40 is not particularly limited. In the present embodiment, as illustrated in FIG. 5, an image carrier holder 55 that holds a flat panel display (in the following, a display 31), such as a tablet computer or a smart phone, such that the image display surface 32 directly faces the half mirror 20 is included as the image carrier 30. As illustrated in FIG. 5, the image carrier holder 55 has an opening on at least one side, and is one that allows the tablet computer, the smart phone, or the like to be slidably inserted through the opening, thereby supporting at least two facing ends from a lower surface. The image carrier holder may be a frame member that supports at least two facing ends of the flat panel display from the lower surface.

Even in a case where nothing is interposed between the image display surface 32 and the mirror surface 22 as in the present embodiment, positioning is made such that an optical distance $h_{31}$ between the image display surface 32 and the mirror surface 22 and an optical distance $h_{32}$ between the mirror surface 22 and the writing surface 12 become equal to each other.

In the present example, the optical distance $h_{31}$ between the image display surface 32 and the mirror surface 22 is the distance $L_1$ between the image display surface 32 and the mirror surface 22, that is, $h_{31}=L_1$, and the optical distance $h_{32}$ between the mirror surface 22 and the writing surface 12 is expressed by a sum of the product $n_2 \cdot d_2$ of the thickness $d_2$ of the half mirror 20, and the refractive index $n_2$, and the distance $L_2$ between the surface 24 of the half mirror 20, and the writing surface 12, that is, $h_{32}=n_2 \cdot d_2+L_2$.

By adjusting the position of the half mirror 20 and the position of the image display surface 32 such that the above optical distances $h_{31}$ and $h_{32}$ become equal to each other, a mirror image obtained by the mirror image displayed on the image display surface 32 of the image carrier 30 from the observation part being reflected by the mirror surface 22 and visually recognized is seen to coincide with the writing surface 12.

Moreover, the autograph support device 2 of the present embodiment comprises a luminance sensor 90 that measures the luminance of the writing surface 12, and a control unit 100 that controls, on the basis of the luminance measured by the luminance sensor 90, at least one of the luminance of the reflection image of the image display surface 32 that is reflected by the half mirror 20 and visually recognized and the luminance of the transmission image of the writing surface 12 visually recognized by transmitting the half mirror 20, and adjusts the ratio of the luminance of the reflection image and the luminance of the transmission image.

Figure 6:
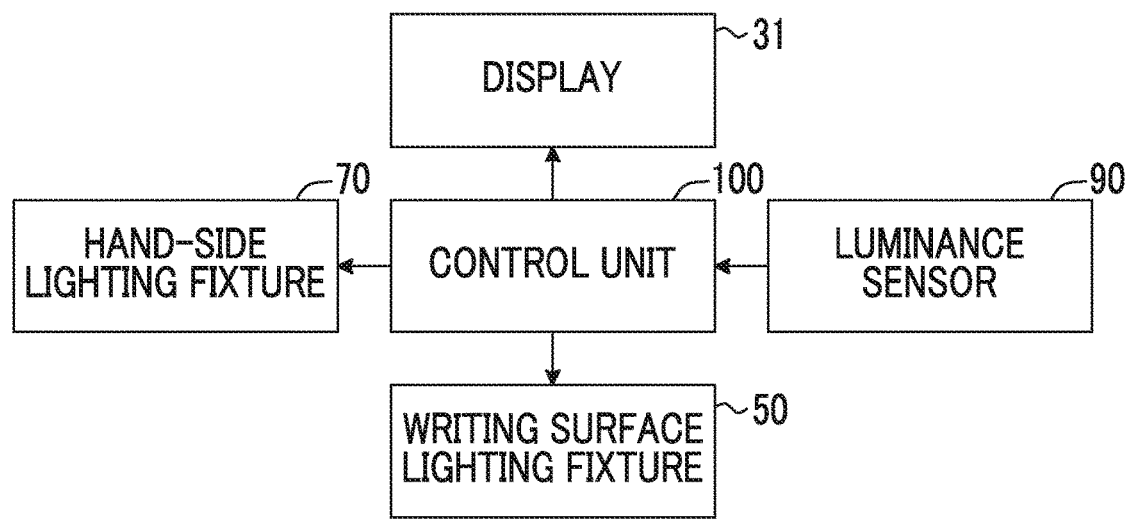
FIG. 6 is a block diagram illustrating a control configuration by a control unit of the autograph support device of the second embodiment.

The control unit 100 is connected to the luminance sensor 90, the display 31, the writing surface lighting fixture 50, and the hand-side lighting fixture 70 (refer to FIG. 6). By changing at least one the luminance of the display screen of the display 31 or the illuminance resulting from the writing surface lighting fixture 50 on the basis of the luminance of the writing surface 12 measured by the luminance sensor 90, the control unit 100 controls a luminance Ma of the reflection image of the display image and the luminance Mb of the transmission image of the writing surface in a case where the user performs visual recognition, and adjusts such that the ratio Ma/Mb is appropriate.

The luminances Ma and Mb are controlled to be $0.01<Ma/Mb<100$, preferably $0.1<Ma/Mb<10$, and more preferably $0.2<Ma/Mb<8$.

Additionally, in this case, it is preferable to satisfy $1<Ma+Mb<10000$ cd/m$^2$, it is more preferable to satisfy $3<Ma+Mb<5000$ cd/m$^2$, and it is particularly preferable to satisfy $10<Ma+Mb<1000$ cd/m$^2$.

The luminance Ma of the reflection image can be controlled by changing the luminance La of the display screen of the display 31. The luminance La of the display screen is approximately proportional to the luminance Ma of the reflection image. The luminance La of the display screen of the display 31 can be controlled by changing the brightness of a backlight. In the present embodiment, the control unit 100 controls the luminance Ma of the reflection image by performing brightness adjustment of the backlight. Here, a relationship between control signal values for adjusting the brightness of the backlight, and the luminance La of the display screen and the luminance Ma of the reflection image is investigated in advance, and the relational expression or table is provided.

In addition, the luminance Ma of the reflection image can also be controlled by changing a K-value of CMYK signal values of an image displayed on the display. Hence, the control unit 100 can also be configured so as to the luminance by adjusting the K value of the CMYK signal values of the image to a value at which the desired luminance Ma is obtained.

Additionally, the luminance Mb of the transmission image of the writing surface 12 can be controlled by changing an illuminance Ib resulting from the writing surface lighting fixture 50. Also, the luminance Lb of the writing surface 12 measured by the luminance sensor 90 is determined depending on the illuminance Ib resulting from the writing surface lighting fixture 50. Hence, the luminance Lb of the writing surface 12 measured by the luminance sensor 90 is in correlation with the luminance Mb of the transmission image of the writing surface 12. The control unit 100 comprises the relational expression or table obtained by investigating the relationship between the luminance Lb of the writing surface 12 and the luminance Mb of the transmission image of the writing surface 12 in advance. Accordingly, the control unit 100 can obtain the luminance Mb of the transmission image from the luminance Lb of the writing surface.

The luminance control resulting from the control unit 100 is performed, for example, as follows.

First, an initial luminance $Lb_0$ of the writing surface 12 is measured by the luminance sensor 90 in an initial state (before control). In this case, although a state where the writing surface lighting fixture 50 is not turned on may be the initial state, in the present embodiment, a state where the writing surface lighting fixture is turned on with predetermined initial illumination will be described as the initial state. It is assumed that the brightness of the backlight of the display 31 is also set to a predetermined initial value.

The control unit 100 receives the initial luminance $Lb_0$ obtained by the luminance sensor 90, and obtains initial luminance $Mb_0$ of the transmission image of the writing surface 12 in that case with reference to the relational expression or table provided in a storage unit in advance.

Additionally, the control unit 100 obtains an initial luminance Ma0 of the reflection image in that case from an initial value of the brightness of the backlight of the display 31 with reference to the relational expression or table provided in the storage unit in advance.

In a case where the initial luminances $Ma_0$ and $Mb_0$ satisfy a desired relationship, the writing surface and the reflection image are visually recognized in an excellent state, it is determined that excellent wiring support is possible, and the adjustment processing is finished.

On the other hand, in a case where the initial luminances $Ma_0$ and $Mb_0$ do not satisfy the desired relationship, the control unit 100 controls signal values for adjusting the brightness of the backlight and/or light modulation signal values for adjusting the light emission amount (illuminance) resulting from the writing surface lighting fixture in order to obtain the luminance Ma of the reflection image and the luminance Mb of the transmission image that satisfies the desired relationship.

Also, the control unit 100 adjusts the brightness of the backlight of the display 31 depending on the control signal values, and/or adjusts the light emission amount of the writing surface lighting fixture 50 depending on the light modulation signal values. Accordingly, the luminance Ma of the reflection image and the luminance Mb of the transmission image that satisfy the desired relationship are set, the writing surface and the reflection image is possible in an excellent state, excellent wiring support is possible, and the adjustment processing is finished.

The control unit 100 is mounted on a computer comprising well-known hardware components, such as a central processing unit (CPU), a main storage, an auxiliary storage, an input/output interface, and a communication interface. Predetermined programs for the luminance control are installed in the computer, and control of the ratio between the luminance of the reflection image of the display image and the luminance of the transmission image of the writing surface is realized as already described by executing the programs. The control unit 100 may be mounted on personal digital assistants, such as a tablet computer comprising the display 31.

In addition, the control unit 100 is connected also to the hand-side lighting fixture 70, and can also adjust the light emission amounts of the light sources of the hand-side lighting fixture 70, that is, the illuminance of the hand side resulting from the hand-side lighting fixture 70.

It is preferable that the luminance Mc (hereinafter, referred to as "hand-side luminance Mc") observed from the observation part of the hand side illuminated by the hand-side lighting fixture 70 is adjusted so as to be within a desired range with respect to the luminance Ma of the reflection image. Specifically, in a case where the luminance Ma of the reflection image and the luminance Mb of the transmission image are Mb<100 and 0.01<Ma/Mb, it is preferable to adjust Mc so as to be 0.01<Ma/Mc<100. It is more preferable to adjust Mc so as to be 0.1<Ma/Mc<10, and it is particularly preferable to adjust Mc so as to be 0.2<Ma/Mc<8.

The invention can be configured such that the relationship between the light emission amounts (hand-side illuminance) of the light sources and the luminance Mc of the hand-side lighting fixture 70 is investigated in advance, the relational expression or table is stored in the storage unit of the control unit 100, the Ma and Mb are set, and the Mc is set. By virtue of such a configuration, the control unit 100 can control the hand-side lighting fixture 70 so as to adjust the light emission amounts of the light sources depending on the Mc.

In addition, although the luminance sensor 90 that measures the luminance of the writing surface 12 is provided in the above embodiment, a camera may be installed on the upper surface of the half mirror 20, values relevant to the luminance Mb of the transmission image, or the luminance Mb and the hand-side luminance Mc of the transmission image may be calculated from the International Organization for Standardization (ISO) sensitivity of the camera, F value, shutter speed, and the brightness of a captured image, and the luminance Mb or the luminances Mb and Mc may be performed.

Additionally, a luminance detector may be installed at an upper part and a lower part of the half mirror 20, the value relevant to the luminance Ma of the reflection image, the luminance Mb of the transmission image, and the hand-side luminance Mc may be acquired from respective representative points, and control of the luminances Ma, Mb, and Mc may be performed.

Figure 7:
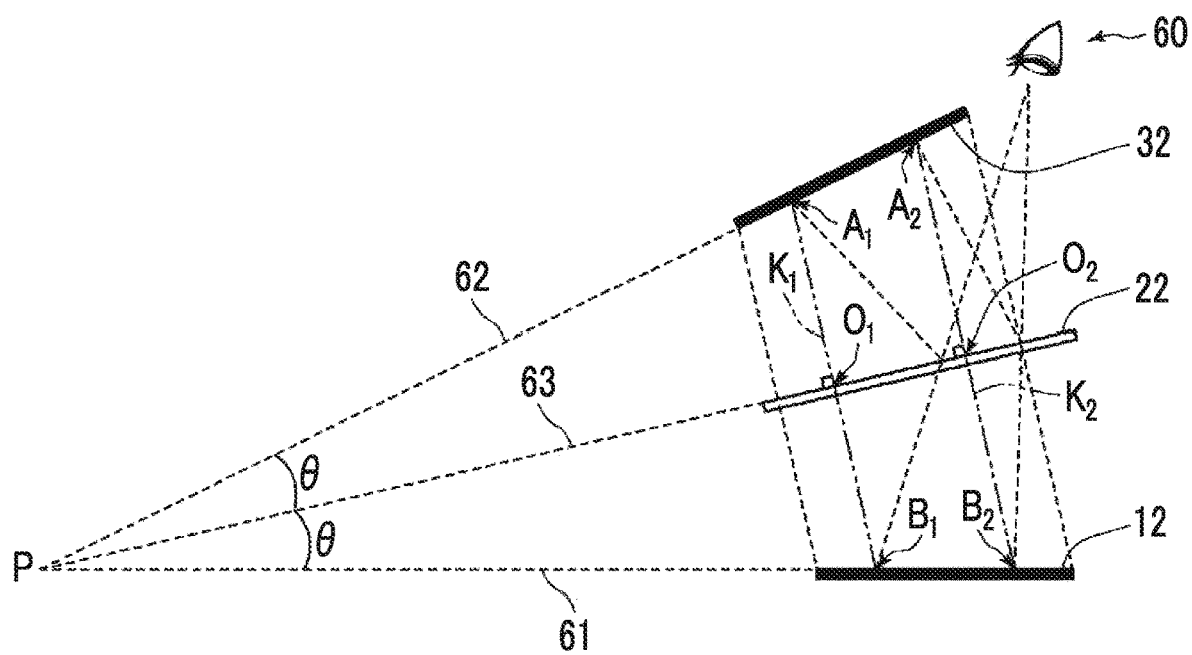
FIG. 7 is a schematic view illustrating another example of the arrangement of the image display surface, a mirror surface, and a writing surface in the autograph support device of the invention.

A positional relationship along the image display surface, the mirror surface, and the writing surface is not limited to a configuration in which these surfaces are parallel to each other as illustrated in the previous embodiments. FIG. 7 is a schematic view illustrating another example of the arrangement of the image display surface, the mirror surface, and the writing surface in the autograph support device of the invention.

In FIG. 7, the image display surface 32 and the writing surface 12 are disposed with an inclination symmetrically with respect to the mirror surface 22. However, arrangement is made such that optical distances of corresponding positions of the image display surface 32 and the writing surface 12 with respect to the mirror surface 22 become equal to each other. The position of the writing surface 12 corresponding to a predetermined position of the image display surface 32 is a position $B_1$ where one perpendicular line $K_1$ intersects the writing surface 12 at a point $A_1$ where the perpendicular line $K_1$ perpendicular to any point $O_1$ of the mirror surface 22 intersects the image display surface 32. The position of the writing surface 12 corresponding to a point $A_2$ where a perpendicular line $K_2$ perpendicular to another arbitrary point $O_2$ of the mirror surface 22 intersects the image display surface 32 is point $B_2$ where the perpendicular line $K_2$ intersects the writing surface 12. When the optical distances of the corresponding positions of the image display surface 32 and the writing surface 12 with respect the mirror surface 22 have the same relationship, Optical distance $A_1O_1$=Optical distance=$B_1O_1$, and Optical distance $A_2O_2$=Optical distance $B_2O_2$ are established.

In the side view illustrating in FIG. 7, in a case where lines on the image display surface 32, the writing surface 12, and the mirror surface 22 are extended, their extension lines intersect each other at one point P. The three extension lines constitute two equal sides of 61, 62 of an isosceles triangle having this point P as a vertex and a median line 63 that equally divides a corner formed by these two sides 61 and 62. Here, a relationship among these three surfaces when presupposing that the optical distance between the image display surface 32 and the mirror surface 22 and the optical distance between the writing surface 12 and the mirror surface 22 are equal to each other is illustrated schematically. In a case where the thickness of the supporting plate of the supporting member or the half mirror is sufficiently small, the optical distance of the thickness of the supporting plate or the half mirror is negligible. However, it is necessary to strictly take an optical distance of equivalent to the thickness of the supporting plate of the supporting member or the half mirror into consideration.

Even in this configuration, the reflection image obtained by the mirror image displayed on the image display surface 32 of the image carrier 30 from the observation part being reflected by the mirror surface 22 and visually recognized is seen to coincide with the writing surface 12.

Explanation of References
  1, 2: autograph support device
  5: supporting base
  6: supporting shaft
  7: top plate
  8: vise fixing part
  10: writing medium
  12: writing surface
  20: half mirror
  22: mirror surface
  24: surface of half mirror
  30: image carrier
  31: display
  32: image display surface
  40: supporting member
  41: supporting plate
  42, 44: surface of supporting plate 45: image carrier holder
50: writing surface lighting fixture
52: light source
60: observation part
61, 62: side
63: median line
70: hand-side lighting fixture
72: light
75: writing tool
76: user's finger
77: hand side
80: display surface lighting fixture
90: luminance sensor
100: control unit

What is claimed is:

1. An autograph support device comprising:
a supporting member that supports an image carrier having a planar image display surface that displays a mirror image of an image displayed on a planar writing surface such that the image display surface is located above the writing surface of a writing medium having the planar writing surface; and
a half mirror that is disposed between the writing surface and the image display surface and has a mirror surface facing the image display surface,
wherein the image display surface and the writing surface are disposed at an equal optical distance from the mirror surface of the half mirror interposed therebetween, and
wherein a writing surface lighting fixture that radiates light from the mirror surface side toward the writing surface side to illuminate the writing surface is provided on the writing surface side from the mirror surface.

2. The autograph support device according to claim 1, wherein an illuminance of the writing surface lighting fixture that illuminates the writing surface is variable.

3. The autograph support device according to claim 1, wherein the writing surface lighting fixture is disposed at two spots that face each other across the center of the writing surface.

4. The autograph support device according to claim 1, wherein the writing surface lighting fixture is disposed at a peripheral edge of the half mirror.

5. The autograph support device according to claim 1, further comprising:
a sensor that measures a luminance of the writing surface; and
a control unit that controls, on the basis of the luminance measured by the sensor, at least one of a luminance of a reflection image of the image display surface visually recognized by being reflected from the half mirror and a luminance of the transmission image of the writing surface visually recognized by transmitting the half mirror, and adjusts a ratio of the luminance of the reflection image and the luminance of the transmission image.

6. The autograph support device according to claim 5, wherein the image carrier is constituted by a flat panel display, and
the control unit controls the luminance of the reflection image by changing a luminance of a backlight of the flat panel display.

7. The autograph support device according to claim 6, wherein the control unit controls the luminance of the reflection image by changing a K value of CMYK signal values of the mirror image displayed on the image carrier.

8. The autograph support device according to claim 1, further comprising:
a hand-side lighting fixture that illuminates a hand side including at least one of a writing tool in use or fingers of a user having the writing tool.

9. The autograph support device according to claim 8, wherein the hand-side lighting fixture is disposed between the mirror surface and the writing surface, and applies illumination light of which spread to the mirror surface and the writing surface is limited to a portion between the mirror surface and the writing surface.

10. The autograph support device according to claim 8, wherein the hand-side lighting fixture applies illumination light from two different directions.

11. The autograph support device according to claim 8, wherein a wavelength of the illumination light of the hand-side lighting fixture is a wavelength of monochromatic light.

* * * * *